US009590399B2

(12) United States Patent
Adachi

(10) Patent No.: US 9,590,399 B2
(45) Date of Patent: Mar. 7, 2017

(54) WIRE HARNESS AND MANUFACTURING METHOD OF EXTERIOR MEMBER

(71) Applicant: YAZAKI CORPORATION, Tokyo (JP)

(72) Inventor: Hideomi Adachi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/657,626

(22) Filed: Mar. 13, 2015

(65) Prior Publication Data
US 2015/0188300 A1 Jul. 2, 2015

Related U.S. Application Data
(63) Continuation of application No. PCT/JP2013/081185, filed on Nov. 19, 2013.

(30) Foreign Application Priority Data

Nov. 21, 2012 (JP) ................................ 2012-254953

(51) Int. Cl.
H02G 3/04 (2006.01)
H01B 13/00 (2006.01)
B60R 16/02 (2006.01)
H02G 3/32 (2006.01)

(52) U.S. Cl.
CPC ....... H02G 3/0406 (2013.01); B60R 16/0207 (2013.01); B60R 16/0215 (2013.01); H01B 13/0013 (2013.01); H02G 3/0468 (2013.01); H02G 3/0487 (2013.01); H02G 3/32 (2013.01)

(58) Field of Classification Search
CPC ............... H02G 3/0406; H02G 3/0468; B60R 16/0207; H01B 13/0013
USPC ........................................ 174/72 A; 264/104
See application file for complete search history.

(56) References Cited

U.S. PATENT DOCUMENTS

| 6,622,756 B2 | 9/2003 | Berninger et al. |
| 7,868,256 B2 | 1/2011 | Suzuki |
| 2001/0023767 A1 | 9/2001 | Berninger et al. |
| 2004/0026109 A1 | 2/2004 | Suzuki |

(Continued)

FOREIGN PATENT DOCUMENTS

| AU | 2002 300 704 B2 | 1/2008 |
| AU | 2002300704 B2 | 1/2008 |

(Continued)

OTHER PUBLICATIONS

International Preliminary Report on Patentability and English language Written Opinion of the International Search Report for PCT/JP2013/081185.

(Continued)

Primary Examiner — Timothy Thompson
Assistant Examiner — Charles Pizzuto
(74) Attorney, Agent, or Firm — Kenealy Vaidya LLP

(57) ABSTRACT

An exterior member includes a flexible tube part having flexibility and an inflexible tube part having flexibility lower than that of the flexible tube part. The inflexible tube part has a plurality of protruding parts formed to protrude from an outer surface thereof. The protruding parts are formed so as to extend in a circumferential direction of the outer surface and arranged at intervals in an axial direction of a tube of the exterior member.

7 Claims, 9 Drawing Sheets

(56) References Cited

U.S. PATENT DOCUMENTS

| | | |
|---|---|---|
| 2010/0147557 A1 | 6/2010 | Suzuki |
| 2011/0132638 A1* | 6/2011 | Oga .................... H02G 3/0462 174/135 |

FOREIGN PATENT DOCUMENTS

| | | | | |
|---|---|---|---|---|
| CN | 101425664 A | 5/2009 | | |
| CN | 202034715 U | 11/2011 | | |
| CN | 202454988 U | 9/2012 | | |
| EP | 0 865 130 A1 | 9/1998 | | |
| EP | 0865130 A1 * | 9/1998 | ............... | H02G 3/04 |
| EP | 1 137 139 A2 | 9/2001 | | |
| EP | 2 903 108 A1 | 8/2015 | | |
| EP | 2 908 395 A1 | 8/2015 | | |
| JP | 2003-87945 A | 3/2003 | | |
| JP | 2007-060780 * | 3/2007 | ............... | H02G 3/04 |
| JP | 2007-60780 A | 3/2007 | | |
| JP | 2009-27856 A | 2/2009 | | |
| JP | 2009-143326 A | 7/2009 | | |
| JP | 2009-290916 A | 12/2009 | | |
| JP | 2010-51042 A | 3/2010 | | |
| WO | 2008/044345 A1 | 4/2008 | | |
| WO | 2013145751 A2 | 10/2013 | | |

OTHER PUBLICATIONS

International Search Report and Written Opinion of the International Search Report for PCT/JP2013/081185 dated Dec. 24, 2013.
The extended European search report for the related European Patent Application No. 13856605.4 dated Mar. 24, 2016.
Japanese Office Action for the related Japanese Patent Application No. 2012-254953 dated May 19, 2016.
Chinese Office Action for the related Chinese Patent Application No. 201380055870.2 dated Aug. 2, 2016.
Chinese Office Action for the related Chinese Patent Application No. 2013800558702.2 dated Dec. 19, 2016.

* cited by examiner

WIRE HARNESS AND MANUFACTURING METHOD OF EXTERIOR MEMBER

CROSS REFERENCE TO RELATED APPLICATIONS

This application is a continuation of PCT application No. PCT/JP2013/081185, which was filed on Nov. 19, 2013 based on Japanese Patent Application (No. 2012-254953) filed on Nov. 21, 2012, the contents of which are incorporated herein by reference.

BACKGROUND OF THE INVENTION

1. Field of the Invention

One or more embodiments of the present invention relate to a wire harness including a conductive path and an exterior member made of resin into which the conductive path is inserted and a manufacturing method of the exterior member.

2. Description of the Related Art

As a usual wire harness, a wire harness is known which electrically connects high-voltage devices (namely, for high voltage) mounted on, for instance, a hybrid motor vehicle or an electric vehicle.

A wire harness disclosed in JP-A-2010-51042 includes a plurality of conductive paths, a corrugated tube made of resin which accommodates the plurality of conductive paths together and a protector made of resin. The corrugated tube is formed in the shape of a bellows tube having flexibility and the plurality of corrugated tubes is arranged in a longitudinal direction of the wire harness. The protector is arranged in a part where a path needs to be regulated. Further, the protector is provided at a position where the adjacent corrugated tubes are connected to each other. The corrugated tube and the protector are used as the exterior member.

SUMMARY OF THE INVENTION

In the above-described usual technique, the protector is used in the part where the path needs to be regulated. As compared therewith, the inventor of this application considers that a structure in which the protector is not used, but a straight tube having rigidity is employed and the straight tube having the rigidity is formed integrally with the bellows tube is more effective to regulate the path of the wire harness. However, this structure needs to consider moldability.

The present invention is devised by considering the above-described circumstances, and it is an object of the embodiments of the present invention to provide a wire harness including an exterior member which is effective for regulating a path and considers moldability and a manufacturing method of an exterior member.

In order to achieve the above-described object, a wire harness and a manufacturing method of an exterior member according to the embodiments are characterized by below-described (1) to (7).

(1) A wire harness includes at least one conductive path and a tube body shaped exterior member made of resin which covers the conductive path. The exterior member includes a flexible tube part having flexibility and an inflexible tube part having flexibility lower than that of the flexible tube part. The inflexible tube part has a plurality of protruding parts formed to protrude from an outer surface thereof. The protruding parts are formed so as to extend in a circumferential direction of the outer surface and arranged at intervals in an axial direction of a tube of the exterior member.

According to the wire harness of the above-described (1), when the flexible tube part is arranged in a part which needs to be bent, and the inflexible tube part is arranged in a part which needs to regulate a path, the wire harness can be arranged in a desired path. Further, in the wire harness of the above-described (1), a molding device which can achieve a linear resin molding (specifically described by referring to below-described embodiments) can be used. When the molding device is used, the exterior member including the flexible tube part and the inflexible tube part can be molded with resin. When the above-described molding device is used, the protruding parts which are extended in the circumferential direction are formed in at least the inflexible tube part of the exterior member, so that the linear resin molding can be effectively realized. This is realized because the protruding parts are positively used so that the exterior member may be linearly pushed out to be molded. Namely, according to the wire harness of the above-described (1), moldability can be improved. When the above-described molding device is used, the device can be restrained from being enlarged. In addition thereto, when the protruding parts are formed, a surface area can be increased. Thus, a cooling time during a molding can be shortened. Further, since the cooling time is shortened, a mold opening operation can be immediately carried out. Thus, the moldability can be more improved.

As a result, according to the wire harness of the above-described (1), the exterior member having a form which is effective to regulate the path and considers the moldability can be included in a composition.

(2) The wire harness of the above-described (1) has a recessed part formed in such a way that an inner surface is recessed in a position of the back side of the protruding part in the inner surface of the inflexible tube part.

According to the wire harness of the above-described (2), since the recessed part is formed in the inner surface of the inflexible tube part, a thickness of the protruding part is not large. Accordingly, the thickness can be made to be uniform in a part where the protruding part is provided and a part where the protruding part is not provided.

As a result, according to the wire harness of the above-described (2), the form can be stabilized and the moldability can be more improved as well as the effects of the wire harness of the above-described (1).

(3) In the wire harness according to the above-described (2), a recessed width of the recessed part is formed to be shorter than an interval to an adjacent recessed part thereto.

According to the wire harness of the above-described (3), the recessed width of the recessed part is shortened, so that the thickness can be made to be uniform as described above, and, when the conductive path is inserted into the exterior member, the conductive path can be hardly caught in the exterior member.

As a result, according to the wire harness of the above-described (3), an inserting operation of the conductive path can be smoothly carried out as well as the effects of the wire harness of the above-described (2).

(4) In the wire harness according to the above-described (2) or (3), a curved surface or a taper is formed in a recessed edge part of the recessed part.

According to the wire harness of the above-described (4), the thickness can be made to be uniform as described above, and, when the conductive path is inserted into the exterior member, the conductive path can be hardly caught in the exterior member.

As a result, according to the wire harness of the above-described (4), the inserting operation of the conductive path can be smoothly carried out as well as the effects of the wire harness of the above-described (2) or (3).

(5) In the wire harness according to any one of the above-described (1) to (4), the inflexible tube part has at least one second protruding part formed to protrude from the outer surface thereof and the second protruding part is formed so as to extend in the axial direction of the tube.

According to the wire harness of the above-described (5), since the second protruding part is formed in the inflexible tube part, the surface area can be more increased. Thus, the cooling time during the molding can be more shortened. Further, since the second protruding part is formed so as to extend in the axial direction of the tube, a rigidity of the inflexible tube part can be improved.

As a result, according to the wire harness of the above-described (5), the moldability can be more improved or the rigidity can be increased in addition to the effects of the wire harness of any one of the above-described (1) to (4).

(6) In the wire harness according to any one of the above-described (1) to (5), the conductive path is formed to be lengthy so as to be arranged from a front part to a rear part of an underfloor of a vehicle and the exterior member is formed to have a length corresponding to that of the conductive path.

According to the wire harness of the above-described (6), the wire harness can be applied to regulate a path of a long wire harness.

As a result, according to the wire harness of the above-described (6), the wire harness can be effectively applied to regulate the path of the long wire harness in addition to the effects of the wire harness of any one of the above-described (1) to (5).

(7) A manufacturing method of a tube body shaped exterior member made of resin, the exterior member including a flexible tube part having flexibility and an inflexible tube part having flexibility lower than that of the flexible tube part, the inflexible tube part having a plurality of protruding parts formed to protrude from an outer surface thereof, and the protruding parts being formed so as to extend in a circumferential direction of the outer surface and arranged at intervals in an axial direction of a tube of the inflexible tube part, the manufacturing method including: a resin molding process in which resin material linearly conveyed from an upstream side is sequentially clamped by a plurality of die blocks to be resin molded; and a process in which during a mold opening of the die blocks in the resin molding process, the die blocks catch the protruding parts to push out the exterior member to a downstream side.

According to the manufacturing method of the exterior member of the above-described (7), the above-described molding device which can achieve the linear resin molding can be used. Accordingly, according to the manufacturing method of the exterior member of the above-described (7), the moldability can be improved. Further, when the above-described molding device is used, the device can be restrained from being enlarged.

DETAILED DESCRIPTION OF THE EXEMPLARY EMBODIMENTS

A wire harness of the present invention includes a conductive path and an exterior member made of resin. In the wire harness, a path is regulated by the exterior member. The exterior member includes a flexible tube part and an inflexible tube part. In the inflexible tube part, a protruding part is formed to protrude from an outer surface thereof and extends in a circumferential direction.

First Embodiment

Figure 1:
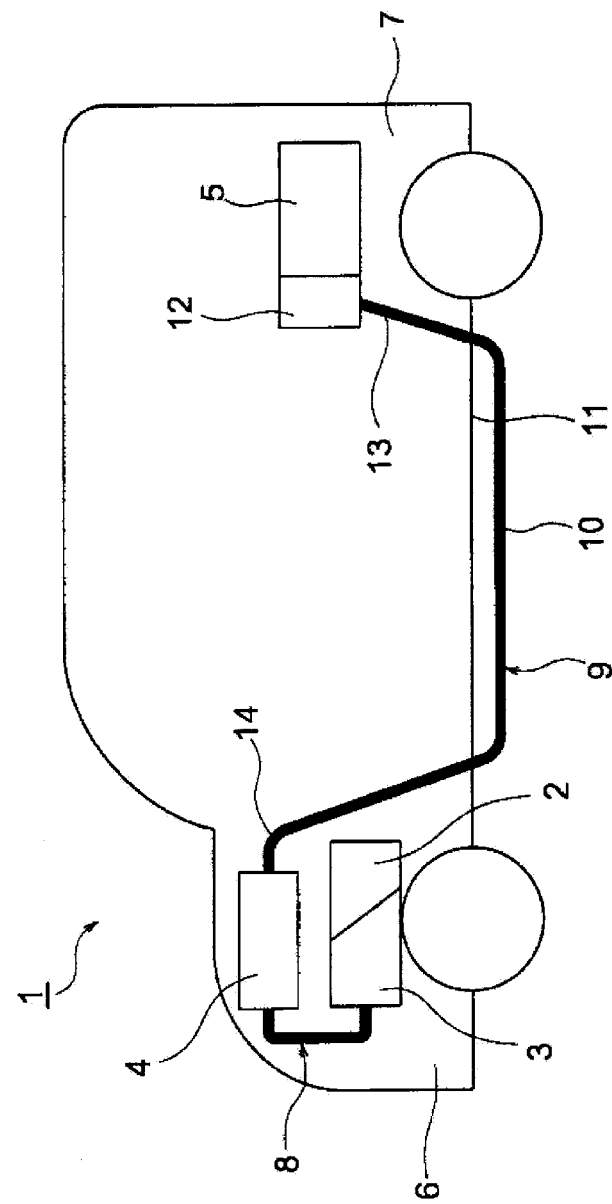
FIG. 1 is a schematic view showing a wired state of a wire harness of a first embodiment.
Figure 2:
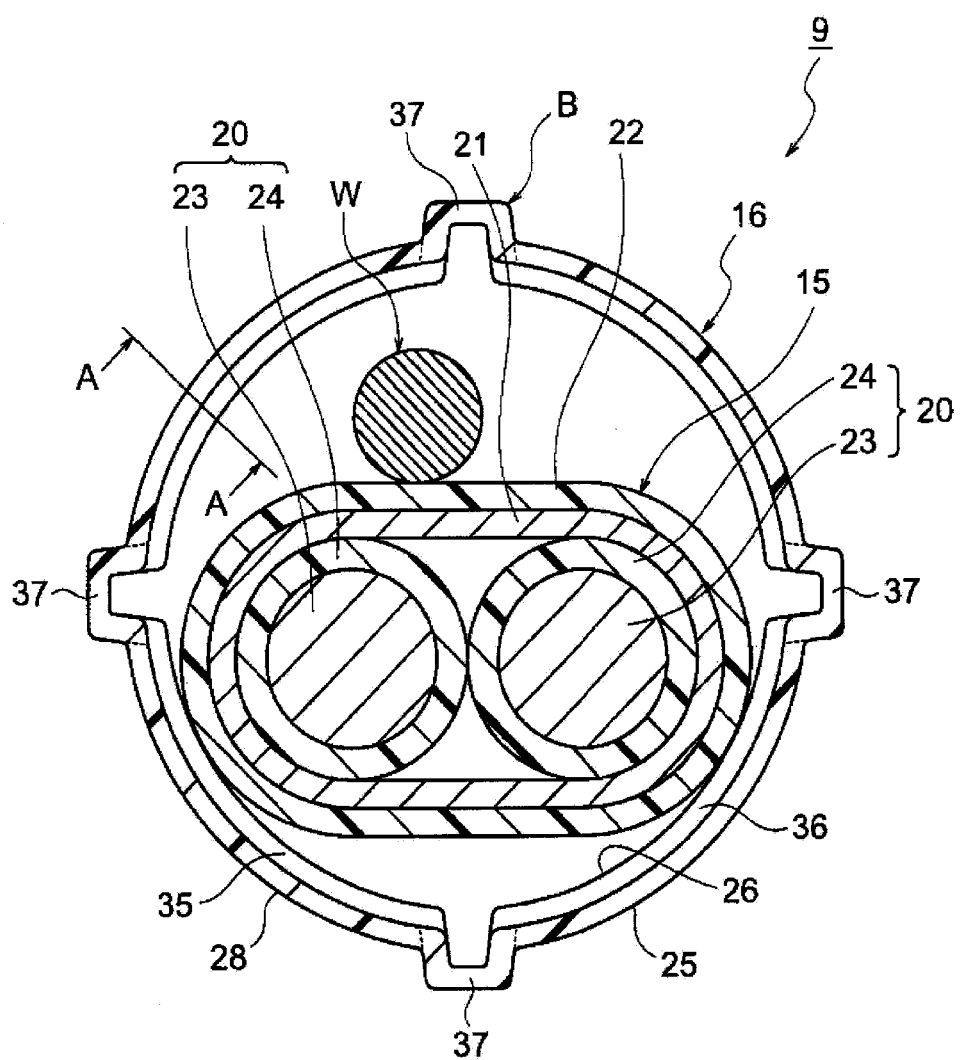
FIG. 2 is a cross-sectional view of the wire harness.
Figure 3A:
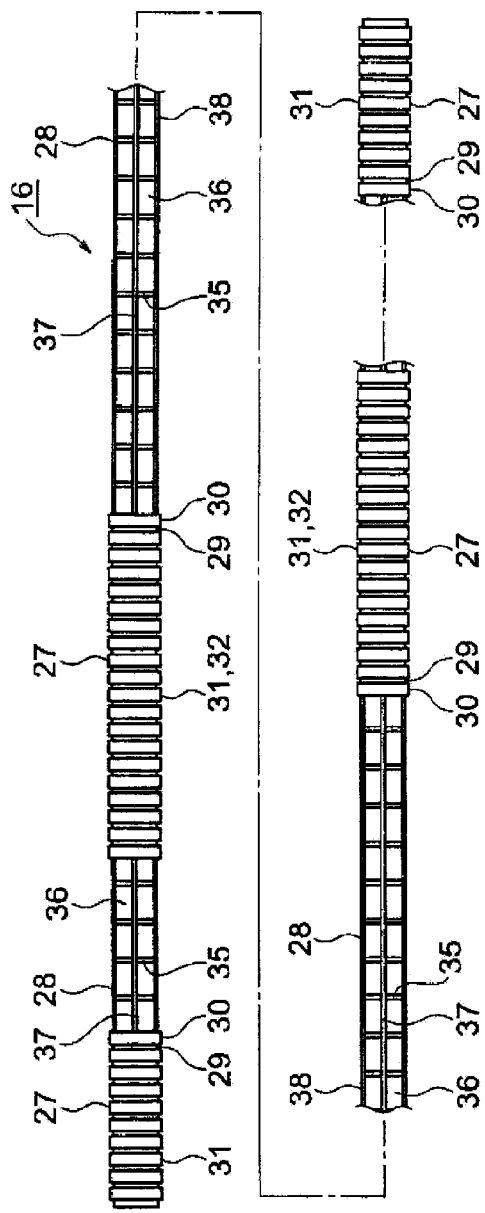
FIG. 3A is a structure diagram of an exterior member.
Figure 3C:
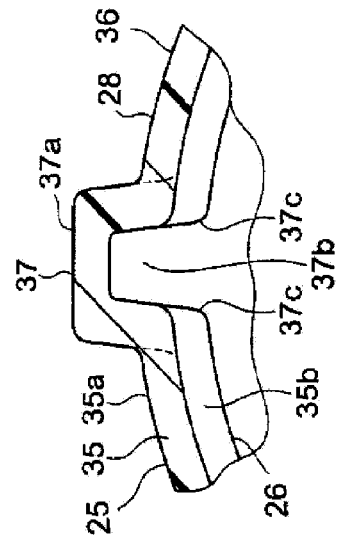
FIG. 3C is a cross-sectional view, as indicated at B in FIG. 2, in main parts of the exterior member shown in FIG. 3A.
Figure 4:
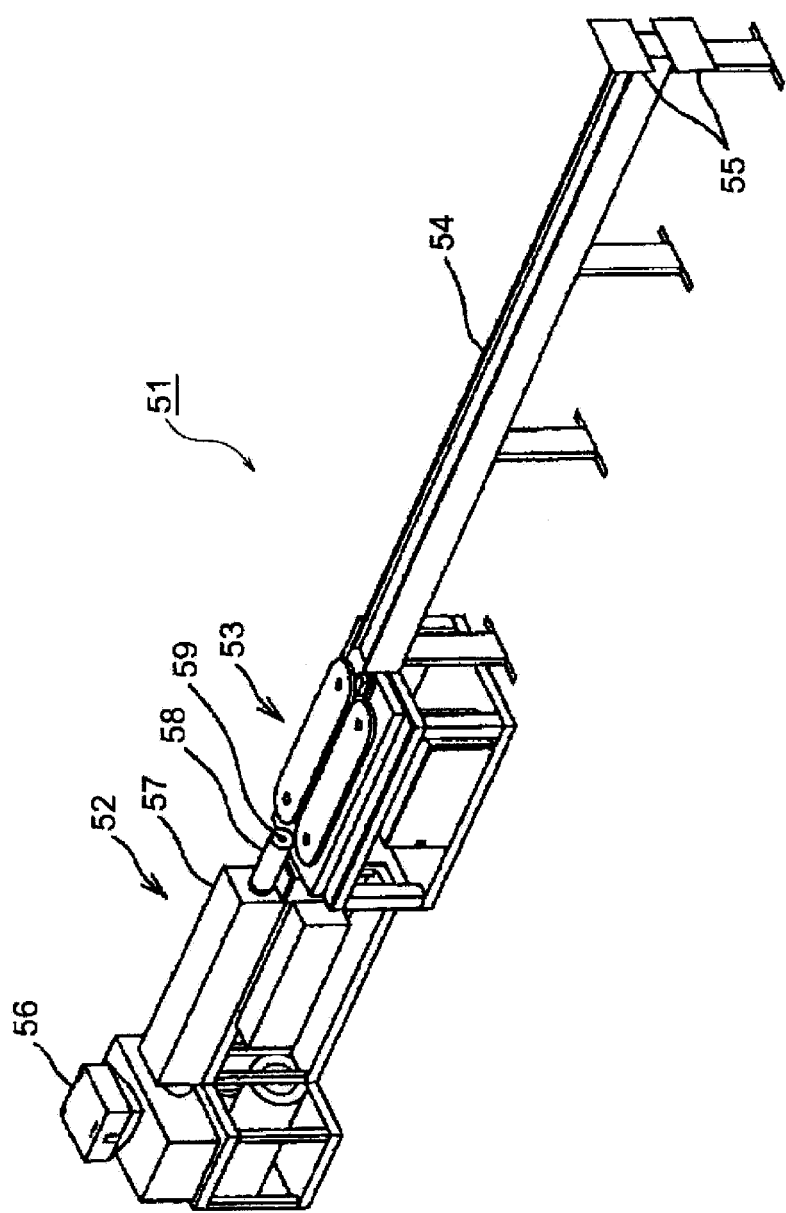
FIG. 4 is a perspective view showing a manufacturing device of the exterior member.
Figure 5:
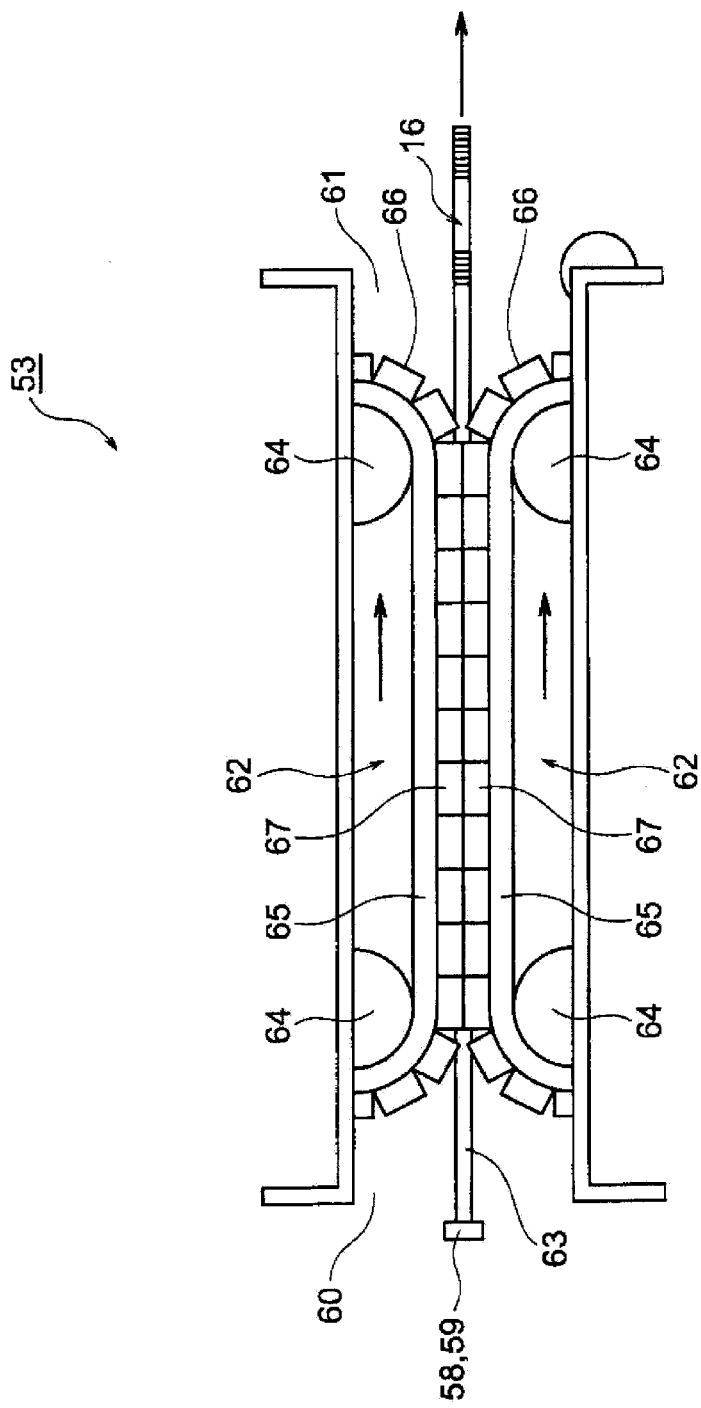
FIG. 5 is a plan view showing main parts of the manufacturing device shown in FIG. 4.
Figure 6:
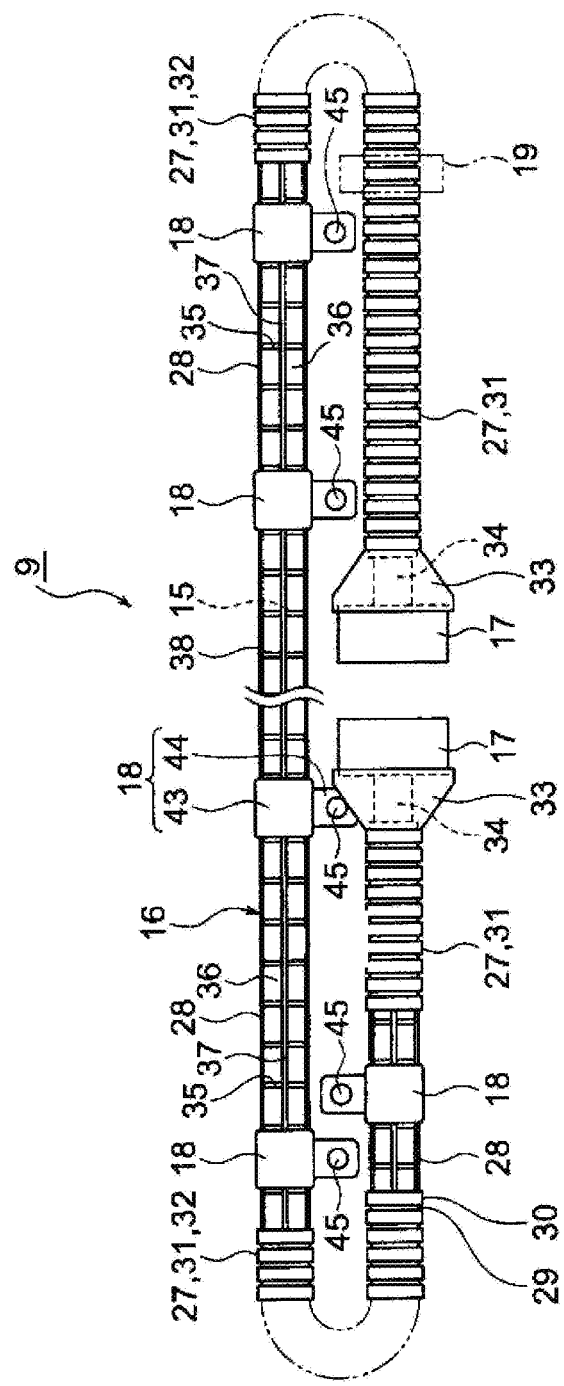
FIG. 6 is a diagram showing the wire harness during transportation.
Figure 7:
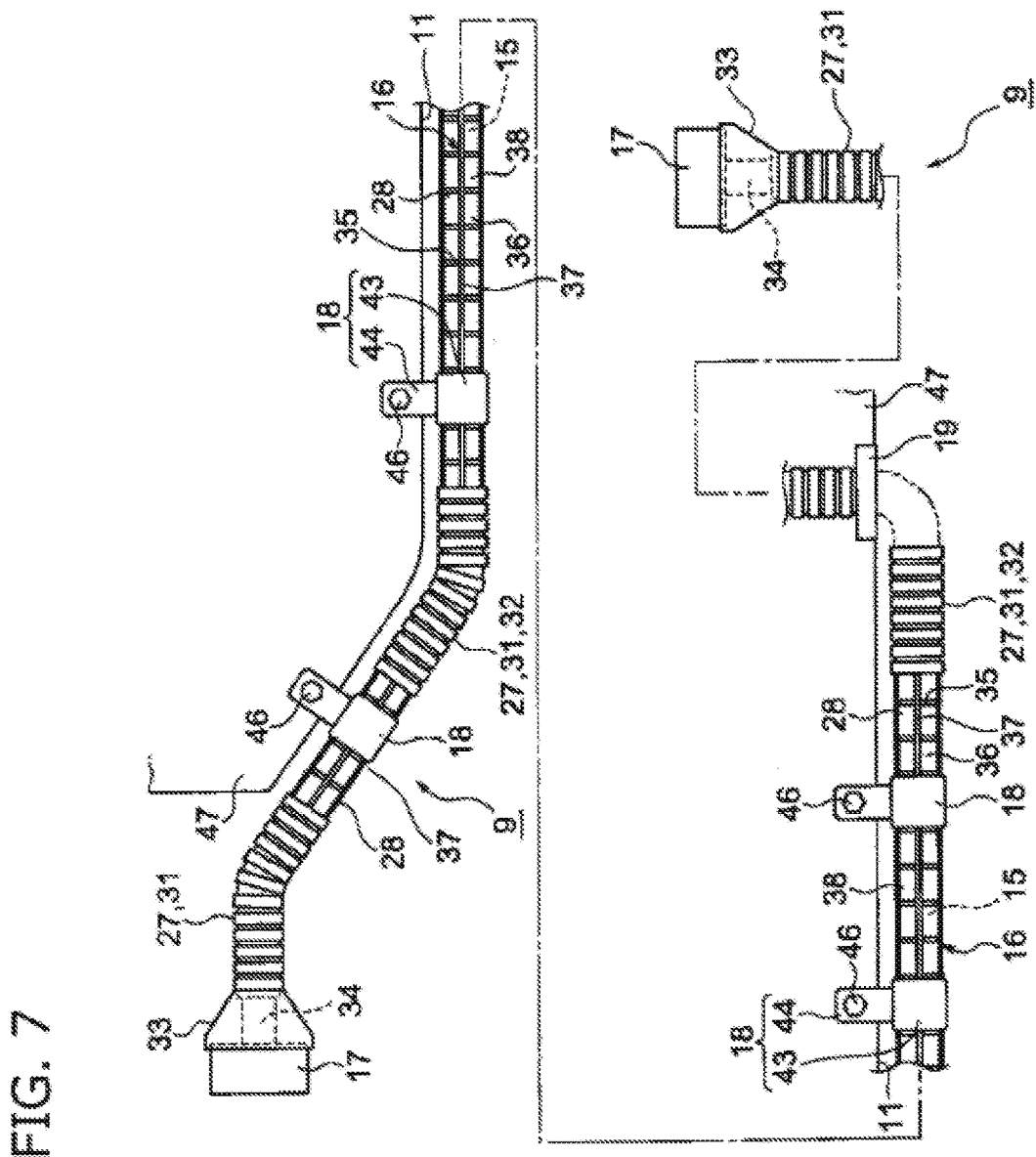
FIG. 7 is a diagram showing the wire harness when a path is arranged.

Now, a first embodiment according to a wire harness of the present invention will be described below by referring to FIG. 1 to FIG. 7. FIG. 1 is a schematic view showing a wired state of the wire harness of the first embodiment. Further, FIG. 2 is a cross-sectional view of the wire harness. FIG. 3A is a structure diagram of an exterior member, FIG. 3 B is a longitudinally sectional view in main parts of the exterior member shown in FIG. 3A and FIG. 3C is a cross-sectional view in main parts of the exterior member shown in FIG. 3A. FIG. 4 is a perspective view showing a manufacturing device of the exterior member. FIG. 5 is a plan view showing main parts of the manufacturing device shown in FIG. 4. FIG. 6 is a diagram showing the wire harness during transportation. FIG. 7 is a diagram showing the wire harness when a path is arranged.

In the first embodiment, an example is exemplified and described that the present invention is used for the wire harness arranged in a hybrid motor vehicle (or an electric vehicle or an ordinary motor vehicle may be used).

In FIG. 1, reference numeral 1 designates a hybrid motor vehicle. The hybrid motor vehicle 1 is a vehicle driven by mixing two powers of an engine 2 and a motor unit 3. To the motor unit 3, an electric power from a battery 5 (in other words, a battery pack) is supplied through an inverter unit 4. The engine 2, the motor unit 3 and the inverter unit 4 are mounted on an engine room 6 at a position near front wheels in this example. Further, the battery 5 is mounted on a rear part 7 of the motor vehicle near rear wheels. The battery 5 may be mounted in an interior of the motor vehicle located in a rear part of the engine room 6.

The motor unit 3 is electrically connected to the inverter unit 4 by a wire harness 8 for a high voltage. Further, the battery 5 is also electrically connected to the inverter unit 4 by a wire harness 9 for a high voltage. The wire harness 9 is formed in a long shape and has its intermediate part 10 arranged in a vehicle underfloor 11. Further, the wire harness 9 (in other words, a below-described high voltage conductive path 15 and an exterior member 16) is arranged from a front part to a rear part of the vehicle underfloor 11 and substantially in parallel along the vehicle underfloor 11. The vehicle underfloor 11 is a known body and what is called a panel member and has a through hole (not shown in the drawing) formed at a prescribed position. The wire harness 9 is water-tightly inserted into the through hole. Thus, the wire harness 9 passes through the through hole from the engine room 6 arranged in a front side of the vehicle underfloor 11, is arranged from the front part to the rear part of the vehicle underfloor 11 and arranged to the rear part 7 of the motor vehicle provided in a rear side of the vehicle underfloor 11 after the wire harness 9 passes through again the through hole.

The wire harness 9 is electrically connected to the battery 5 through a junction block 12 provided in the battery 5. To the junction block 12, a rear end 13 of the wire harness 9 is electrically connected by a known method. A front end 14 side of the wire harness 9 is electrically connected to the inverter unit 4 by a known method.

The motor unit 3 includes a motor (not shown in the drawing) and a generator (not shown in the drawing). Further, the inverter unit 4 includes an inverter (not shown in the drawing) and a converter (not shown in the drawing). The motor unit 3 is formed as a motor assembly including a shield case (not shown in the drawing). Further, the inverter unit 4 is also formed as an inverter assembly including a shield case (not shown in the drawing). The battery 5 is an Ni-MH type or an Li-ion type and formed as a module. For instance, a storage battery such as a capacitor may be used. When the battery 5 can be used for the hybrid motor vehicle 1 or the electric vehicle, the battery 5 is not specially limited.

Initially, a composition and a structure of the wire harness 9 will be described.

In FIG. 2, the wire harness 9 includes the high voltage conductive path 15 (namely, a conductive path), the exterior member 16 which accommodates therein and protects the high voltage conductive path 15, a shielded connector 17 (namely, a connection member. See FIG. 6 and FIG. 7) provided in an end of the high voltage conductive path 15, a plurality of clamps 18 (namely, fixing members. See FIG. 6 and FIG. 7) attached to an outer surface of the exterior member 16 and a grommet 19 (namely, a water stop member. See FIG. 6 and FIG. 7) similarly attached water-tightly to the outer surface of the exterior member 16.

The wire harness 9 may be formed in such a way that a low voltage conductive path is accommodated in the exterior member 16 together with the high voltage conductive path 15 so as to be protected. In this case, the low voltage conductive path is arranged in, for instance, a position shown by a reference character W in FIG. 2.

The high voltage conductive path 15 includes two high voltage circuits 20, a shield member 21 which covers the two high voltage circuits 20 and a sheath 22 provided outside the shield member 21. Such a structure of the high voltage conductive path 15 shows one example.

The high voltage circuit 20 is a known high voltage electric wire herein, and includes a conductor 23 and an insulator 24 with which the conductor 23 is coated. The high voltage circuit 20 has a length required for an electric connection. Since the wire harness 9 electrically connects the inverter unit 4 to the battery 5 (in other words, the junction block 12) (see FIG. 1), the high voltage circuit 20 is formed so as to be lengthy.

The conductor 23 is manufactured by copper or copper alloy or aluminum or aluminum alloy. The conductor 23 may have either a conductor structure formed by twisting element wires, or a rod shaped conductor structure with a rectangular shape or a round shape in section (for instance, a conductor structure having a square angle single core or a round single core, and in this case, the electric wire itself is rod shaped.). The above-described conductor 23 is formed in such a way that an extrusion molding of the insulator 24 made of an insulating resin material is carried out on an outer surface thereof.

As the high voltage circuit 20, the known high voltage electric wire is used in the first embodiment, however, the present invention is not limited thereto. Namely, as the high voltage circuit 20, a high voltage circuit may be adopted which is formed by providing an insulator in a known bus bar.

The shield member 21 is an electromagnetic shield member which covers the two high voltage circuits 20 together (namely, a shield member as countermeasure against electromagnetic wave), and a known braided member is used which is formed by braiding many element wires in a tubular form. The shield member 21 is formed so as to have substantially the same length as an entire length of the two high voltage circuits 20. The shield member 21 is, in its end part, electrically connected to a shield case (not shown in the drawing) of the inverter unit 4 (see FIG. 1) through the above-descried shielded connector 17 (see FIG. 6 and FIG. 7).

The shield member 21 may use, for instance, a metallic foil having an electric conductivity or a member including the metallic foil which could deal with the electromagnetic wave.

The sheath 22 is formed by carrying out an extrusion molding of the insulating resin material outside the shield member 21 with a prescribed thickness and arranged in a position of an outermost layer of the high voltage conductive path 15. To the sheath 22, an end process is applied so that the shield member 21 is exposed with a prescribed length in the manufacture of the wire harness 9. Under a state after the end process, the sheath 22 is, for instance, a little longer than the exterior member 16.

As the conductive path, a known shielded electric wire may be exemplified as well as the high voltage conductive path 15. The number of the conductive paths may be set to at least one. A plurality of conductive paths may be used. Further, a high voltage coaxial compound conductive path (not shown in the drawing) may be used which is formed so as to have a positive circuit and a negative circuit coaxially provided in one conductive path or three or more circuits coaxially provided in one conductive path.

In FIG. 2 and FIG. 3, the exterior member 16 is a tubular body made of resin which covers the high voltage conductive path 15 and is formed in a configuration with a length required to accommodate the high voltage conductive path 15 and a thickness required to protect the high voltage conductive path. Further, the exterior member 16 is also formed in a configuration having no joints nor slits which lead from an outer surface 25 thereof to an inner surface 26 thereof (Namely, the outer surface 25 is allowed to communicate with the inner surface 26). The exterior member 16 is formed in the configuration and a lengthy configuration which can reject water (namely, waterproof) from the high voltage conductive path 15.

The exterior member 16 is configured in a circular form in section in the first embodiment. The sectional form of the exterior member 16 shows one example. The exterior member may be configured in an oval form or an elliptic form or a rectangular form in section as shown in a below-described second embodiment and a third embodiment. The exterior member 16 includes a plurality of flexible tube parts 27 having a flexibility and a plurality of inflexible tube parts 28 without the flexibility like that of the flexible tube parts 27 (in other words, the flexibility is lower than that of the flexible tube parts 27) and is formed in, for instance, a configuration shown in FIG. 3.

The flexible tube parts 27 and the inflexible tube parts 28 are integrally formed with resin in such a manner that under a state that the flexible parts 27 are not bent, an entire part is configured in a linear form. The flexible tube parts 27 and the inflexible tube parts 28 are arranged so as to be alternately continuous in an axial direction of a tube.

The flexible tube part 27 is arranged in a position so as to meet an attached form to the vehicle (namely a form of a part to which the wire harness is wired, a form of an object to which the wire harness is fixed). Further, the flexible tube part 27 is also formed with a length which meets the attached form to the vehicle. Since the plurality of flexible tube parts 27 has different lengths in the axial direction of the tube, the flexible tube parts 27 can be bent with required lengths so as to meet the attached form to the vehicle. Such flexible tube parts 27 can be respectively bent at desired angles during a below-described packing or transportation of the wire harness 9 or during an arrangement of a path to the vehicle (see FIG. 6 and FIG. 7).

The flexible tube parts 27 can be bent to have bent forms and, as a matter of course, can be returned to original straight forms.

The flexible tube part 27 is configured in a bellows tube form in the first embodiment. As long as the flexible tube part 27 has the flexibility, its form is not especially limited. Specifically, the flexible tube part 27 includes recessed parts 29 and protruding parts 30 extending in the circumferential direction. The recessed parts 29 and the protruding parts 30 are formed so as to be alternately continuous in the axial direction of the tube.

The flexible tube part 27 includes a flexible tube part 31 for the arrangement of the path which is bent during the arrangement of the path and a flexible tube part 32 for the packing and the transportation which is bent under a packed state and during the transportation of the wire harness 9. The flexible tube part 27 may be arranged and formed in a part which does not need to be bent.

The exterior member 16 is configured in a form that the flexible tube part 27 is arranged in an end side thereof (in other words, in the vicinity of an end). Further, the exterior member 16 is formed to have a length so that an end part of the flexible tube part 27 arranged in the end side thereof (in other words, a side in the vicinity of the end) is extended to a part near the shielded connector 17 (namely, the connection member. See FIG. 6 and FIG. 7). The vicinity of the shielded connector 17 means such a nearness as to bring about no difficulty in an electric connection work to the inverter unit 4 (see FIG. 1) by the shielded connector 17 or such a nearness as to bring about no difficulty in the end process of the high voltage conductive path 15. Since the flexible tube part 27 has the flexibility as described above, the flexible tube part 27 can be extended to a position considerably near to the shielded connector 17.

To the end part of the flexible tube part 27 arranged in the end side, a flexible waterproof member is attached which is extended to the shielded connector 17 (see FIG. 6 and FIG. 7). As the waterproof member, for instance, a boot 33 (see FIG. 6 and FIG. 7) made of rubber may be exemplified. The boot 33 is attached to cover an end part 34 (see FIG. 6 and FIG. 7) of the high voltage conductive path 15 pulled out from the end part of the flexible tube part 27 or an opening part of the end part of the flexible tube part 27. The waterproof member may be arbitrarily attached and the waterproof member does not need to be provided. In place of the boot 33, a tape winding part formed by winding a waterproof tape may be exemplified.

To the flexible tube part 27 of the plurality of flexible tube parts 27 in the exterior member 16 which is arranged so as to correspond to the position of the through hole of the vehicle underfloor 11 (see FIG. 1), a water stop member is attached which is water tight to an outer surface thereof and also to the through hole. As the water stop member, the grommet 19 (See FIG. 6 and FIG. 7) made of, for instance, rubber may be exemplified. The grommet 19 is attached as a member for preventing an entry of water through the through hole.

The exterior member 16 is configured in such a form as if an arranged part of the flexible tube part 27 forms a corrugated tube. In other words, since the exterior member 16 is configured in the form having the corrugated tube partly provided. Since the exterior member 16 has the part of the corrugated tube as described above, the exterior member 16 may be considered to be a "corrugated tube" or a "partly-formed-corrugated tube".

The exterior member 16 is formed in such a way that slits are not provided along the axial direction of the tube thereof (namely, no slits in a body). As reasons why the slits are not provided, a point may be considered that the entry of water to the exterior member 16 is prevented to improve a waterproof property. Further, a point may be also considered that the high voltage conductive path 15 is prevented from protruding in, for instance, the bent part. Further, a point may be considered that a rigidity of the exterior member 16 itself is improved. In addition thereto, the exterior member 16 is configured in the form having no joints in the circumferential direction. Reasons thereof are the same as those in the case of the above-described slits.

When the exterior member 16 can satisfy the above-described points, the exterior member 16 can be configured in such a form as to be divided in prescribed positions. In this case, the exterior member 16 is integrated by bonding or welding, or an after-attaching member for connection. The after-attaching member preferably has a structure in which the high voltage conductive path 15 does not float relative to the inner surface 26 of the exterior member 16 in a connected part. The above-described structure is used, because heat generated in the high voltage conductive path 15 is transmitted to the exterior member 16 by the contact of the high voltage conductive path 15 to radiate the heat from the outer surface 25 of the exterior member 16.

The inflexible tube part 28 includes an inflexible tube part main body 36 having a protruding part 35 and a second protruding part 37. The inflexible tube part main body 36 is formed as a part which is not bent in a below-described packed state or during transportation or during an arrangement of a path. The "part which is not bent" means a part which is not allowed to positively have the flexibility. The inflexible tube part main body 36 is configured in the form of a straight tube which is circular in section. The sectional form of the inflexible tube part main body 36 is not limited to the circular form in section, and an oval form or an elliptic form or a rectangular form may be adopted.

The inflexible tube part 28 is configured in the form of a straight tube as shown in the drawing. Accordingly, the inflexible tube part 28 can be considered to be a "straight tube part" or a "straight part". The inflexible tube part 28 is formed in a rigid part as compared with the flexible tube part 27. The inflexible tube part 28 is also formed at such a position or with such a length as to meet the attached form to the vehicle.

The exterior member 16 has an inflexible tube part 38 for the underfloor which is arranged in the vehicle underfloor 11 (see FIG. 1) as the inflexible tube part 28. Since the inflexible tube part 38 for the underfloor is arranged in the vehicle underfloor 11 (for instance, arranged so as to extend along a lean hose), the inflexible tube part 38 is formed to be long. The inflexible tube part 38 for the underfloor is supposed to be a kind of the inflexible tube part 28.

The protruding part 35 is configured in an annular form so that the protruding part 35 protrudes from the outer surface 25 of the inflexible tube part 28 and extends in the circumferential direction. Further, a plurality of protruding parts 35 are arranged in the axial direction of the tube. The protruding part 35 may be formed as a plurality of protrusions arranged in the circumferential direction. Further, the plurality of protruding parts 35 do not need to be arranged at intervals in the axial direction of the tube, and only one protruding part 35 may be arranged. The protruding part 35 is formed in such a way that an outer surface 25 side of the inflexible tube part 28 is formed to protrude as a protruding part 35a. Further, an inner surface 26 side is formed in such a way that the inner surface 26 is recessed as a recessed part 35b. As can be understood from a below-described manufacturing device 51, the protruding part 35 is effective as a part which improves a moldability of the exterior member 16.

Here, when it is assumed that a recessed width of the recessed part 35b is D and an interval between the recessed part 35b and an adjacent (namely, neighboring) recessed part 35b in the axial direction of the tube (namely, a length of a part having no recessed part) is C, the recessed width D of the recessed part 35b is formed to be shorter than the interval C in the axial direction of the tube. Thus, when the high voltage conductive path 15 is inserted into the exterior member 16, the high voltage conductive path 15 is hardly caught in the exterior member 16. A depth of the recessed part 35b is set to an arbitrary depth. In the first embodiment, the depth of the recessed part 35b is set to a depth smaller than that of the second protruding part 37.

In a recessed edge part of the protruding part 35, a curved surface 35c (or a taper) is formed. The curved surface 35c is formed in order to prevent an inserting end part of the high voltage conductive path 15 from being caught.

The second protruding part 37 is formed so as to protrude from the outer surface 25 of the inflexible tube part 28 similarly to the protruding part 35. Further, the second protruding part 37 is formed so as to extend in the tube axial direction. Further, a plurality of second protruding parts 37 are arranged and formed in the circumferential direction. An arrangement at a pitch of 90° shown in FIG. 3A illustrates one example. The second protruding part 37 is formed in such a way that an outer surface 25 side of the inflexible tube part 28 is formed to protrude as a protruding part 37a. Further, an inner surface 26 side is formed in such a way that the inner surface 26 is recessed as a recessed part 37b. In a recessed edge part of the second protruding part 37, a curved surface 37c (or a taper) is formed.

The protruding part 35 and the second protruding part 37 are effective as parts which ensure a surface area as well as the above-described effects. When the surface area is increased, a cooling time can be shortened during a molding. Further, when the cooling time is shortened, a mold opening operation can be immediately carried out. Further, as understood from FIG. 3A, the protruding part 35 and the second protruding part 37 are also effective as parts for improving rigidity.

In addition thereto, the protruding part 35 and the second protruding part 37 are also effective as parts which regulate a movement of the after-attaching member such as the clamp 18 (see FIG. 6 and FIG. 7), as parts which recognize an attached position of the after-attaching member, and further as parts which stop a rotation of the after-attaching member.

The above-described exterior member 16 is manufactured by a below-described manufacturing device or a manufacturing method. By referring to FIG. 4 or FIG. 5, an explanation thereof will be given below.

In FIG. 4, reference numeral 51 designates a manufacturing device in which the exterior member 16 (see FIG. 3A) is molded with resin. The manufacturing device 51 (namely, a resin molding device) includes a resin extruding part 52, a molding part 53, a cooling part 54 and a cutting part 55.

To a downstream side of the resin extruding part 52, the molding part 53 is continuous. Further, to a downstream side of the molding part 53, the cooling part 54 is continuous. The cutting part 55 is arranged in an end of the cooling part 54 (namely, arranged in an end of the device) and operates when the exterior member 16 is cut to a prescribed length.

The resin extruding part 52 includes a hopper 56 as a part which charges resin material, an extruding part main body 57 which is horizontally extended continuously to the hopper 56 and a die 58 protruding from an end part of the extruding part main body 57. The die 58 has a resin material extruding opening 59. The resin material extruding opening 59 is arranged in an inlet 60 (see FIG. 5) of the molding part 53.

In FIG. 5, the molding part 53 is a part which linearly carries out resin molding from the inlet 60 to an outlet 61 and has one pair of molding structure parts 62. The one pair of molding structure parts 62 is arranged at both right and left sides of a flexible and tubular resin material 63 (namely, the resin material) led from the resin material extruding opening 59 of the die 58 (see FIG. 4) to form the one pair. The one pair of molding structure parts 62 is formed so as to mold the resin material 63 to a prescribed form.

The molding structure part 62 includes one pair of timing pulleys 64 along an advancing direction of the resin material 63, an endless belt 65 which is moved in a direction as shown by an arrow mark in FIG. 5 by the one pair of timing pulleys 64 and a die block assembly 66 attached to the endless belt 65 to be moved.

The die block assembly 66 has a plurality of die blocks 67. The respective die blocks 67 are arranged with no clearance therebetween in a linear part of the endless belt 65 and sequentially clamp the resin material 63 linearly conveyed from an upstream side (an opposite side to the arrow mark in FIG. 5. a left side in FIG. 5) to mold the resin (namely, a resin molding process). The die blocks 67 are respectively fixed to the endless belt 65 so as to be exchangeable.

The die blocks 67 are respectively moved by the endless belt 65 and operate, during a mold opening, as if the die blocks 67 caught the protruding parts 35 (see FIG. 3A and FIG. 3B) to push out the exterior member 16 to the direction shown by the arrow mark in FIG. 5 (namely, the downstream side). A mold releasing operation of the exterior member 16 is effectively carried out by the protruding parts 35. The protruding parts 35 are effective parts for molding the exterior member 16 with the resin.

Figure 3B:
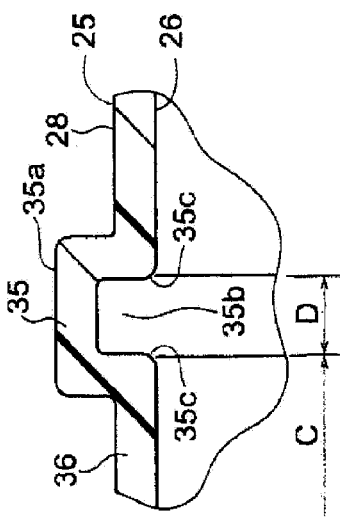
FIG. 3B is a longitudinally sectional view, as indicated at A-A in FIG. 2, in main parts of the exterior member shown in FIG. 3A.

The protruding parts 35 (see FIG. 3A and FIG. 3B are effective to satisfactorily carry out a linear resin molding.

When the protruding parts 35 are positively used, the exterior member 16 can be linearly pushed out and molded.

The above-described manufacturing device 51 or the manufacturing method shows one example. For instance, a blow type device or method may be used as well as the above-described device or the method.

In FIG. 6 and FIG. 7, as the clamp 18 attached to the exterior member 16, a known clamp is used.

The clamp 18 includes a tube body attaching part 43 formed so as to correspond to an external form of the inflexible tube part 28 and a fixing part 44 continuous to the tube body attaching part 43. In the fixing part 44, a bolt insert hole 45 is bored and formed. The wire harness 9 is attached and fixed to an object to be fixed 47 (a form of the object to be fixed 47 shows one example) of the vehicle underfloor 11 through a bolt 46 inserted into the bolt insert hole 45. When the wire harness 9 is attached and fixed to the object to be fixed 47, the arrangement of the path is completed as shown in FIG. 7.

In both the ends of the wire harness 9, the known shielded connectors 17 are respectively provided. One shielded connector 17 is a shielded connector of the inverter side and the other shielded connector 17 is a shielded connector of the battery side. The shielded connector 17 is electrically connected and fixed to the end part 34 of the high voltage conductive path 15 pulled out from the flexible tube part 27. The boot 33 is attached to the shielded connector 17 from the end part of the flexible tube part 27.

Now, the manufacture, the transportation and the arrangement of the path of the wire harness 9 will be described below. In manufacturing processes of the wire harness 9, initially, the high voltage conductive path 15 is inserted into the exterior member 16 the entire part of which is substantially linearly formed, and then, the shielded connectors 17 are provided in the end parts 34 of the high voltage conductive path 15. Further, when the boots 33, the grommets 19 and the clamps 18 are attached to prescribed positions of the outer surface of the exterior member 16, the wire harness 9 is completely manufactured.

The wire harness 9 is manufactured in such a way that the flexible tube parts 27 are arranged in sections which need to be bent, and the inflexible tube parts 28 are arranged in sections which need to regulate the path.

After the wire harness 9 is manufactured, when the wire harness 9 is bent so as to be folded in prescribed parts of the flexible tube parts 27 as shown in FIG. 6, the wire harness 9 is arranged so that the inflexible tube parts 28 (the inflexible tube part 28 and the inflexible tube part 38 for the underfloor in FIG. 6) are substantially parallel to each other. More specifically, to the long inflexible tube part 38 for the underfloor, other inflexible tube part 28 is arranged under a state substantially parallel so as to extend along the inflexible tube for the underfloor. With such a state, an entire length of the wire harness 9 is reduced and the wire harness 9 is packed with a minimum width. Namely, an entire part of the wire harness 9 is packed under a compact state. Then, the wire harness 9 is transported under the compact state.

When the wire harness 9 is attached and fixed to the object to be fixed 47 by using the clamps 18 as shown in FIG. 7, the arrangement of the path of the wire harness is completed. As can be understood from the composition and the structure, the wire harness 9 is arranged so that an entire part of the high voltage conductive path 15 rejects water (namely, is waterproofed) from the one shielded connector 17 to the other shielded connector 17.

As described above by referring to FIG. 1 to FIG. 7, the wire harness 9 according to the first embodiment is arranged in a desired path in accordance with the composition and the structure of the exterior member 16.

Second Embodiment

Figure 8:
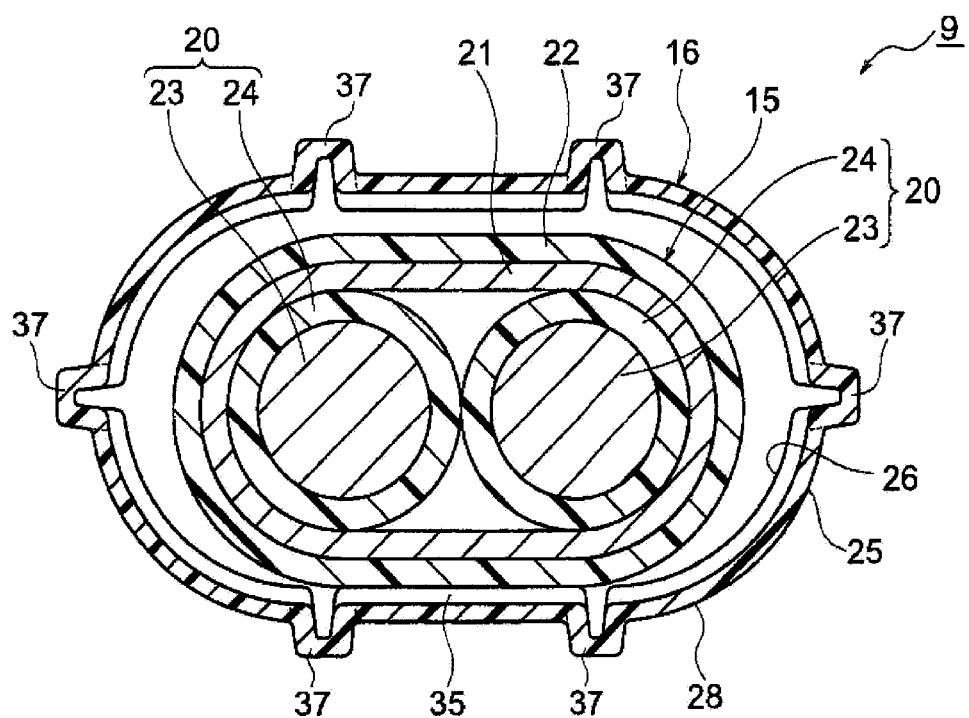
FIG. 8 is a cross-sectional view showing a wire harness of a second embodiment.

Now, by referring to FIG. 8, a second embodiment of a wire harness according to the present invention will be described below. FIG. 8 is a cross-sectional view showing the wire harness according to the second embodiment. Component members which are basically the same as those of the first embodiment are designated by the same reference numerals and a detailed explanation is omitted. The wire harness of the second embodiment is arranged and used like the wire harness of the first embodiment.

In FIG. 8, the wire harness 9 includes a high voltage conductive path 15, an exterior member 16 which accommodates therein and protects the high voltage conductive path 15 and a shielded connector 17 (see FIG. 6 and FIG. 7) provided in an end of the high voltage conductive path 15. The exterior member 16 is not circular in section like the first embodiment and is configured in an oval form in section so as to meet an external form of the high voltage conductive path 15. The exterior member 16 has a plurality of protruding parts 35 and second protruding parts 37 respectively.

Since the exterior member 16 is configured in the oval form in section, a height dimension thereof is lower than that of the first embodiment. When the exterior member 16 is attached and fixed to a vehicle underfloor 11 (see FIG. 1), the exterior member 16 can effectively gain a distance from the ground. Further, since the sheath rememder 16 is configured in the oval form in section, an occupation rate of the high voltage conductive path 15 can be improved in an inner space. Thus, heat of the high voltage conductive path 15 can be effectively and easily transmitted to the exterior member 16. The oval form in section increases a contact area with the high voltage conductive path 15.

Third Embodiment

Figure 9A:
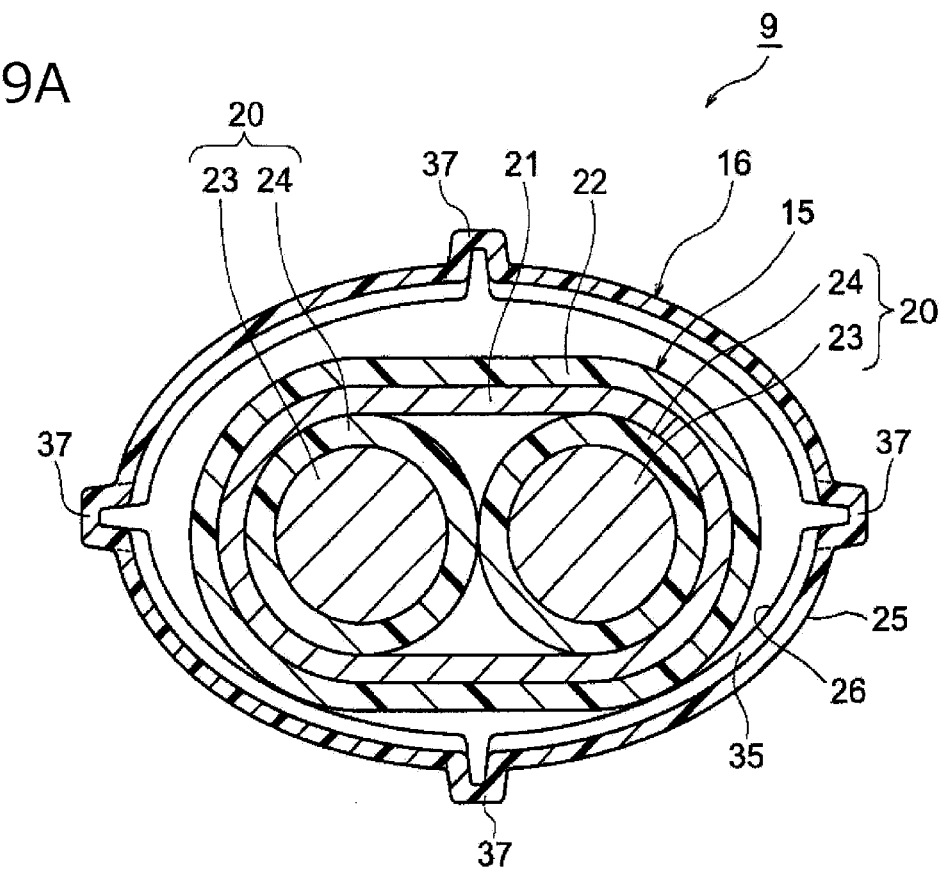
FIG. 9A and FIG. 9B are cross-sectional views showing a wire harness of a third embodiment.
Figure 9B:
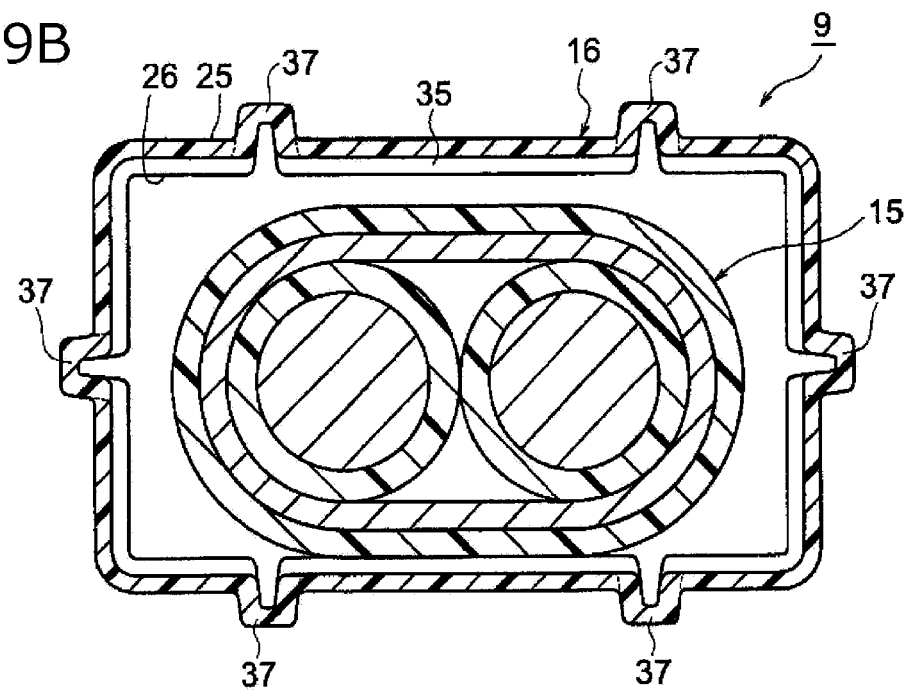

Now, by referring to FIG. 9A and FIG. 9B, a third embodiment of a wire harness according to the present invention will be described below. FIG. 9A and FIG. 9B are cross-sectional views showing the wire harness according to the third embodiment. Component members which are basically the same as those of the first embodiment are designated by the same reference numerals and a detailed explanation is omitted. The wire harness of the third embodiment is also arranged like the wire harness of the first embodiment.

In FIG. 9A, the wire harness 9 includes a high voltage conductive path 15, an exterior member 16 which accommodates therein and protects the high voltage conductive path 15 and a shielded connector 17 (see FIG. 6 and FIG. 7) provided in an end of the high voltage conductive path 15. The exterior member 16 is not circular in section like the first embodiment and is configured in an elliptic form in section. Otherwise, the exterior member 16 is configured in a rectangular form in section as shown in FIG. 9B. The exterior member 16 has a plurality of protruding parts 35 and second protruding parts 37 respectively. The wire harness 9 may include the exterior member 16 having such sectional forms as described above in a composition.

In addition thereto, it is to be understood that the present invention may be variously changed within a scope that does not change the gist of the present invention.

For instance, if a modified example is exemplified, an example may be exemplified that heat reflection parts which reflect heat from an external part are provided at a plurality of positions on the outer surface of the exterior member 16 of the first embodiment to the third embodiment. Further, an example may be also exemplified that an identifying part which identifies a high voltage is provided on an entire part of the outer surface of the exterior member 16 or at a plurality of desired positions.

Now, the wire harness and the manufacturing method of the exterior member according to the embodiments are summarized as described below.

(1) A wire harness 9 according to an embodiment includes at least one conductive path (a high voltage conductive path 15) and a tube body shaped exterior member 16 made of resin which covers the conductive path. The exterior member 16 includes a flexible tube part 27 having flexibility and an inflexible tube part 28 having flexibility lower than that of the flexible tube part 27. The inflexible tube part 28 has a plurality of protruding parts 30 formed to protrude from an outer surface 25 thereof. The protruding parts 30 are formed so as to extend in the circumferential direction of the outer surface 25 and arranged at intervals in the axial direction of a tube of the exterior member 16.

(2) The wire harness 9 according to the embodiment has a recessed part 35b formed in such a way that an inner surface 26 is recessed in a position of the back side of the protruding part 30 in the inner surface 26 of the inflexible tube part 28.

(3) In the wire harness 9 according to the embodiment, a recessed width D of the recessed part 35b is formed to be shorter than an interval C to an adjacent recessed part 35b thereto.

(4) In the wire harness 9 according to the embodiment, a curved surface (or a taper) is formed in a recessed edge part of the recessed part 35b.

(5) In the wire harness 9 according to the embodiment, the inflexible tube part 28 has at least one second protruding part 37 formed to protrude from the outer surface 25 thereof and the second protruding part 37 is formed so as to extend in the axial direction of the tube.

(6) In the wire harness 9 according to the embodiment, the conductive path is formed to be lengthy so as to be arranged from a front part to a rear part of a vehicle underfloor 11 and the exterior member 16 is formed to have a length corresponding to that of the conductive path.

(7) A manufacturing method of an exterior member 16 according to an embodiment is a manufacturing method of a tube body shaped exterior member made of resin which includes a flexible tube part 27 having flexibility and an inflexible tube part 28 having flexibility lower than that of the flexible tube part 27. The inflexible tube part 28 has a plurality of protruding parts 30 formed to protrude from an outer surface 25 thereof. The protruding parts 30 are formed so as to extend in the circumferential direction of the outer surface 25 and arranged at intervals in the axial direction of a tube of the exterior member 16. The manufacturing method of the exterior member 16 according to the embodiment includes a resin molding process in which resin material 63 linearly conveyed from an upstream side is sequentially clamped by a plurality of die blocks 67 to be resin molded. During a mold opening of the die blocks 67 in the resin molding process, the die blocks 67 catch the protruding parts 30 to push out the exterior member to a downstream side.

The wire harness and the manufacturing method of the exterior member according to the present invention are useful from the viewpoint that a wire harness including an exterior member which is effective to regulate a path and considers a moldability and a manufacturing method of an exterior member can be provided.

What is claimed is:

1. A wire harness comprising:
    at least one conductive path and a tube body shaped exterior member made of resin which covers the conductive path,
    wherein the exterior member includes
        a flexible tube part having flexibility, and
        an inflexible tube part having flexibility lower than that of the flexible tube part,
    the inflexible tube part has a plurality of protruding parts formed to protrude from an outer surface thereof, and
    the protruding parts are formed so as to extend in a circumferential direction of the outer surface and arranged at intervals in an axial direction of the tube of the exterior member,
    wherein at a position of a back side of the protruding part in an inner surface of the inflexible tube part, a recessed part is formed in such a way that the inner surface is recessed.

2. The wire harness according claim 1, wherein a recessed width of the recessed part is formed to be shorter than an interval to an adjacent recessed part thereto.

3. The wire harness according to claim 1, wherein a curved surface or a taper is formed in a recessed edge part of the recessed part.

4. The wire harness according to claim 1, wherein
    the inflexible tube part has at least one second protruding part formed to protrude from the outer surface thereof and
    the second protruding part is formed so as to extend in the axial direction of the tube.

5. The wire harness according to claim 1, wherein
    the conductive path is formed to be lengthy so as to be arranged from a front part to a rear part of an underfloor of a vehicle and
    the exterior member is formed to have a length corresponding to that of the conductive path.

6. A manufacturing method of a tube body shaped exterior member made of resin, the exterior member including a flexible tube part having flexibility and an inflexible tube part having flexibility lower than that of the flexible tube part, the inflexible tube part having a plurality of protruding parts formed to protrude from an outer surface thereof, and the protruding parts being formed so as to extend in a circumferential direction of the outer surface and arranged at intervals in an axial direction of a tube of the inflexible tube part, the manufacturing method comprising:
    a resin molding process in which resin material linearly conveyed from an upstream side is sequentially clamped by a plurality of die blocks to be resin molded; and
    a process in which during a mold opening of the die blocks in the resin molding process, the die blocks catch the protruding parts to push out the exterior member to a downstream side,
    wherein the resin molding process includes molding, at a position of a back side of the protruding part in an inner surface of the inflexible tube part, a recessed part in such a way that the inner surface is recessed.

7. The wire harness according to claim 1, further comprising:

at least one clamp is attached to the exterior member at the inflexible tube part, the at least one clamp is configured to mount the wire harness on a vehicle.

\* \* \* \* \*